(12) United States Patent
Lin

(10) Patent No.: US 8,694,168 B2
(45) Date of Patent: Apr. 8, 2014

(54) DIGITAL SHOWER SYSTEM AND OPERATING METHOD FOR WATER MONITORING INFORMATION THEREOF

(75) Inventor: Jingyang Lin, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 282 days.

(21) Appl. No.: 12/883,064

(22) Filed: Sep. 15, 2010

(65) Prior Publication Data

US 2011/0295435 A1 Dec. 1, 2011

(30) Foreign Application Priority Data

May 26, 2010 (CN) .......................... 2010 1 0189185

(51) Int. Cl.
*G05D 7/00* (2006.01)
*G05D 11/00* (2006.01)
*G05D 11/02* (2006.01)
*G05D 11/16* (2006.01)
*G01F 1/00* (2006.01)
*G01F 7/00* (2006.01)
*G01R 11/56* (2006.01)
*G01R 21/133* (2006.01)
*G06F 17/00* (2006.01)
*G08B 21/00* (2006.01)
*A47K 3/28* (2006.01)
*E03B 7/07* (2006.01)

(52) U.S. Cl.
USPC ............. 700/283; 700/285; 702/45; 705/412; 705/413; 340/606; 137/552.7; 4/597; 4/601

(58) Field of Classification Search
USPC ............. 700/281–285; 702/45; 705/400, 412, 705/413; 340/500, 540, 605, 606; 137/551, 137/552.7; 236/12.1; 239/390–392, 397, 239/548, 562; 4/596, 597, 601
See application file for complete search history.

(56) References Cited

U.S. PATENT DOCUMENTS

| | | | | |
|---|---|---|---|---|
| 6,997,064 | B2 * | 2/2006 | Bird et al. | 73/861.75 |
| 7,742,883 | B2 * | 6/2010 | Dayton et al. | 702/45 |
| 7,934,662 | B1 * | 5/2011 | Jenkins | 236/12.1 |
| 8,086,354 | B2 * | 12/2011 | Bondar et al. | 700/284 |
| 8,162,236 | B2 * | 4/2012 | Rodenbeck et al. | 239/390 |
| 8,618,941 | B2 * | 12/2013 | Javey et al. | 340/605 |
| 2008/0110279 | A1 * | 5/2008 | Grueber | 73/861 |
| 2009/0193886 | A1 * | 8/2009 | Walkin | 73/198 |
| 2009/0234513 | A1 * | 9/2009 | Wiggins | 700/300 |
| 2009/0293189 | A1 * | 12/2009 | Somerville | 4/597 |
| 2010/0289652 | A1 * | 11/2010 | Javey et al. | 340/605 |
| 2011/0137827 | A1 * | 6/2011 | Mason et al. | 705/413 |
| 2011/0178644 | A1 * | 7/2011 | Picton | 700/282 |
| 2011/0203364 | A1 * | 8/2011 | Staake et al. | 73/198 |
| 2011/0303311 | A1 * | 12/2011 | Klicpera | 137/551 |

FOREIGN PATENT DOCUMENTS

EP  1367370 A1 * 12/2003
GB  2434207 A  *  7/2007

* cited by examiner

*Primary Examiner* — Crystal J Barnes-Bullock

(57) ABSTRACT

A digital shower system contains a showering equipment including at least one first watering device and at least one second watering device; an input interface including a power key, a knob, an ok key, a return key, and a plurality of outlet switches; a valve unit including a motor, a mixing valve, and a number of outlet valves; a central process unit including a setting module, a time module, a memory module, a calculator module, and a water monitor module; and an indicator so that quantity of water use is known by the user to save water consumption.

8 Claims, 9 Drawing Sheets

DIGITAL SHOWER SYSTEM AND OPERATING METHOD FOR WATER MONITORING INFORMATION THEREOF

BACKGROUND OF THE INVENTION

1. Field of the Invention

The present invention relates to a digital shower system and operating method for water monitoring information thereof that can save water consumption.

2. Description of the Prior Art

A conventional digital shower system or equipment is not provide a water monitoring information, accordingly a user can not know exact quantity of water use to cause water waste.

To solve above-mentioned shortcoming, an improved flow time-counting and monitoring system used in a faucet (US2008/0262755A1) is developed so that water rate is measured and quantities of water use or consumption is calculated, hence the use can know quantities of water use or consumption to save water consumption.

However, such an improved flow time-counting and monitoring system is not electrically connected with a calculator in the faucet or the showering equipment, therefore when the user turns on the faucet, the flow time-counting and monitoring system can not be turned on automatically to count watering time so as achieve an exact quantity of water use. Besides, the flow time-counting and monitoring system is only applicable for the showering equipment with single watering component. Accordingly, the flow time-counting and monitoring system has to be selectively installed in one of a showerhead, a head shower, and a body spray of a multi-function showering equipment so as to set flow rate and water time and to calculate the quantity of water consumption, limiting use efficiency. Likewise, the flow time-counting and monitoring system can not set water cost and calculate the quantity of total water use from different people to show accurate water monitoring information.

A water monitoring device disclosed in US 2009/0301167 is installed to each outlet of every watering component and including a fluid sensor to sense water flow, a time keeper to count watering time. Nevertheless, such a water monitoring device is merely suitable for a single watering component, if there are a plurality of watering components provided on a showering equipment, a number of water monitoring devices has to be installed on the watering components, increasing installation cost. Moreover, the quantity of total water use of the watering components can not be calculated to reflect total water cost.

The present invention has arisen to mitigate and/or obviate the afore-described disadvantages.

SUMMARY OF THE INVENTION

The primary object of the present invention is to provide a digital shower system which is capable of overcoming the shortcomings of the conventional digital shower system.

To obtain the above objectives, a digital shower system provided by the present invention comprises a showering equipment including at least one first watering device and at least one second watering device;

an input interface including a power key, a knob, an ok key, a return key, and a first, a second, and a third outlet switches;

a valve unit including a motor, a mixing valve, and a number of outlet valves; wherein the motor is controlled by the knob to adjust temperature; the mixing valve is used to receive cold and hot waters and driven by the motor to adjust a mixing rate of the cold and the hot waters; the outlet valves are connected with the mixing valve so as to receive mixed cold and hot water from the mixing valve respectively and are turned on/off, when the outlet valves are turned on, the mixed cold and hot water are flowed toward the first or the second watering device of the showering equipment;

a central process unit used to execute micro-machine control calculation based on an instruction from the input interface to control the valve unit, and including a setting module, a time module, a memory module, a calculator module, and a water monitor module; wherein the setting module is used to execute general sets having setting a water cost, setting a flow rate, setting quantities of the showerhead and the head shower, and above set data is stored in the memory module;

the time module is started to count a time of water use when one of the first, the second, and the third outlet switches is turned on to spray water, and data of the water use is transmitted toward the calculator module to be calculated;

the memory module is applied to receive and record a variety of data and transmit the data toward a suitable module, the memory module receives and records data set by the setting module and transmits the data from the calculator module;

the calculator module calculates the water cost on the basis of the quantities of the water use and the total water use and the total water cost, and calculated water use data is transmitted toward the memory module to be stored, and the quantity of the water use is transmitted toward an indicator to be displayed in a predetermined pattern, wherein the pattern is changed with increasing the quantity of the water use;

the water monitor module is used for receiving the data of the quantities of the water use, the last water and the total water use and total water cost from the memory module and the calculator module;

the indicator is used to provide a screen to display the quantity of the water use transmitted from the calculator module so that a user knows information of the water use in the indicator by operating the input interface.

An operating method for water monitoring information of the digital shower system is used to notify a user of an amount of water usage and comprises:

steps of setting a water rate including entering the setting module of the central process unit by ways of the input interface and the indicator; setting the water cost, the flow rate, and the quantities of the showerhead and the head shower so that set data is stored in the memory module, the set data includes the water cost, the flow rate, and the quantities of the showerhead and the head shower; conveying water monitoring information to the user, wherein steps of checking the water monitor include: starting the power key so that the screen of the indicator enters into the temperature page to press the return key of the input interface, such that the setting page is shown; selecting the general set by using the knob and pressing the ok key to enter the general page; selecting the water monitor by using the knob and pressing the ok key to enter a water monitor page, such that a water monitoring information from the water monitor module is shown, wherein the water monitoring information includes the quantities of the water use, the last water use, and the total water use, the total water cost, and a meter reset date;

steps of setting the first and the second body sprays includes starting the power key so that the screen of the indicator enters into the temperature page to press the return key of the input interface so as to further enter the setting page; selecting the first and second body sprays by using the knob, pressing the ok key to enter a body spray page, and selecting an outlet control by using the knob and pressing the ok key to enter an outlet control page; setting one of watering modes by ways of the knob and pressing the ok key to store desired set values in the memory module, wherein the watering modes including a right open mode, an all open mode, and a left open mode, thereby setting the first and the second body spray;

steps of setting the personalized water demand include: starting the power key so that the screen of the indicator enters the temperature page to press the return key of the input interface such that the setting page is shown; selecting the personalized water demand by means of the knob and pressing the ok key to enter a temperature setting page so that an outlet temperature is set by using the knob and confirmed by pressing the ok key to enter an outlet setting page, wherein there are three watering modes to be selectively set in the outlet setting page, and the three watering modes include a showerhead mode, a head shower mode, and a body spray mode; selecting one of the three watering modes in a watering selecting page by pressing the first, the second, the third outlet switches respectively; when the head shower and/or the showerhead are selected and the ok key is pressed, a saving page is shown so that one of codes including user-1, user-2, and user-3 is set by using the knob and confirmed by pressing the ok key to enter the memory module, thereby the personalized water demand is obtained based on the set data;

steps of presetting the user include: starting the power key so that the screen of the indicator enters the temperature page, such that the preset key of the interface is pressed to select a set code during setting the personalized water demand, and when the set code is selected, the showering equipment executes a desired watering mode according to a selected code to make the user have a shower in a selected watering mode;

steps of resetting the water meter include: starting the power key so that the screen of the indicator enters the temperature page, such that the return key of the interface is pressed to enter the page setting page, and then the general mode is selected by using the knob and confirmed by pressing the ok key to enter the general page, and a water meter resetting mode is selected by using the knob and confirmed by pressing the ok key to enter a water meter resetting page so that the knob is used to select a yes or no instruction; wherein if the yes instruction is selected and confirmed by pressing the ok key, the data of the quantities of the water use, the last water use, and the total water use and total water cost stored in the memory module is deleted completely to restart calculating and storing water demand data; and if the no instruction is selected and confirmed by pressing the ok key, the data of the quantities of the water use, the last water use, and the total water use and total water cost is stored in the memory module without being deleted, thus resetting the water meter.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
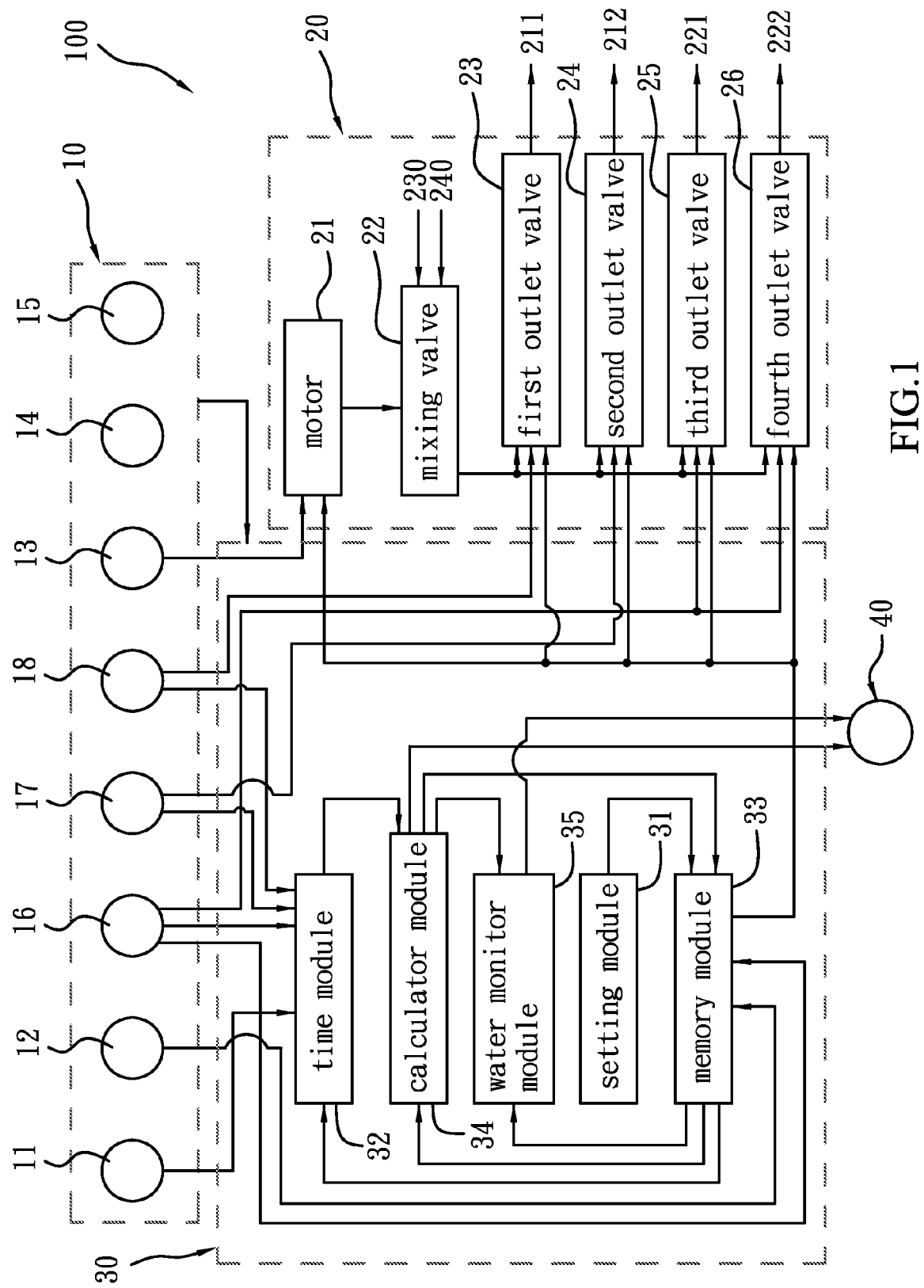
FIG. 1 is a block diagram showing the exploded component of a digital shower system according to a preferred embodiment of the present invention.
Figure 2:
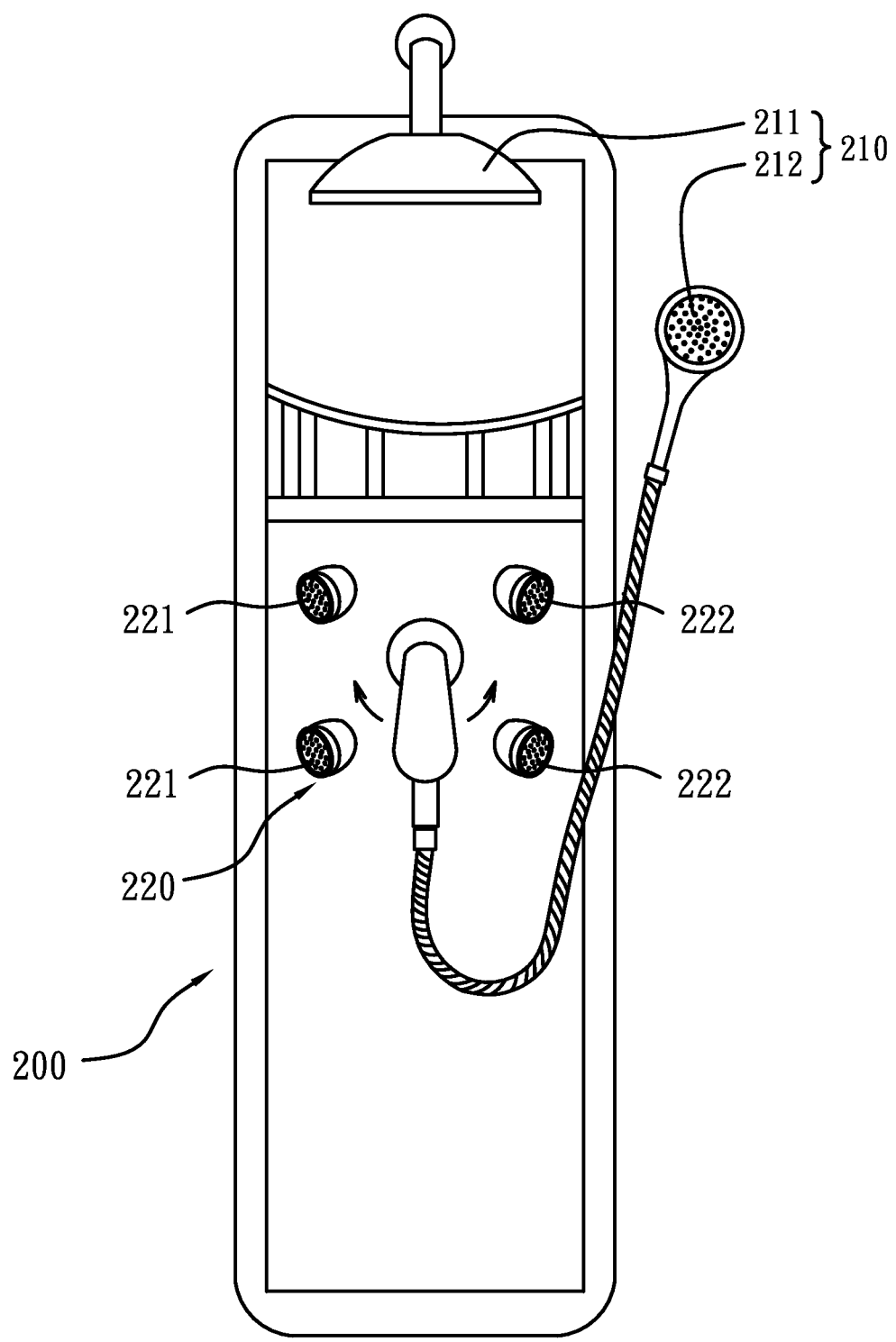
FIG. 2 is a side plan view showing the assembly of a showering equipment according to the preferred embodiment of the present invention.

Referring to FIGS. 1 and 2, a digital shower system 100 according to a preferred embodiment of the present invention comprises a showering equipment 200, and the showering equipment 200 includes at least one first watering device 210 and at least one second watering device 220.

The first watering devices 210 include a showerhead 211 and a head shower 212. The second watering device 220 includes a left watering set and a right watering set, and the left watering set includes two first body sprays 221, the right watering set includes two second body sprays 222.

The digital shower equipment 100 is used in various types of showering equipments, and includes an input interface 10, a valve unit 20, a central process unit 30, and an indicator 40.

The input interface 10 includes a power key 11, a preset key 12, a knob 13, and an ok key 14, a return key 15, and a first, a second, and a third outlet switches 16, 17, 18.

The power key 11 has power on/off and pause functions. The preset key 12 is connected with a memory module 33 to acquire a record for personalized water demand.

The knob 13 is used to control and select a mixing rate of cold and hot waters to obtain desired watering temperature.

The ok key 14 is applied to confirm a selected instruction.

The return key 15 is used to return back to last selected instruction.

The first outlet switch 16 allows to turn on/off the first and the second body sprays 221, 222 of the second watering device 220 through the valve unit 20 to start and stop spraying water.

The second outlet switch 17 allows to turn on/off the showerhead 211 of the first watering device 210 through the valve unit 20 to start and stop spraying water.

The third outlet switch 18 allows to turn on/off the head shower 212 of the first watering device 210 via the valve unit 20 to start and stop spraying water.

The valve unit 20 includes a motor 21, a mixing valve 22, and a number of outlet valves.

The motor 21 is electrically connected with the knob 13 of the input interface 10 to be controlled by the knob 13 to operate.

The mixing valve 22 is coupled with a cold-water inlet tube 230 and a hot-water inlet tube 240, and includes a valve core mounted therein and driven by the motor 21 to operate, such that the mixing rate of the cold and the hot waters from the cold-water inlet tube 230 and the hot-water inlet tube 240 is changed to adjust a mixed temperature of the cold and the hot waters.

The outlet valves are connected with the mixing valve 22 so as to receive mixed cold and hot water from the mixing valve 22 respectively, and include a first outlet valve 23, a second outlet valve 24, a third outlet valve 25, a fourth outlet valve 26. In this embodiment, the first, the second, the third, the fourth outlet valves 23, 24, 25, 26 are a solenoid valve.

The first outlet valve 23 is electrically connected with the third outlet switch 18 to be turned on/off and coupled with the showerhead 211 of the first watering device 210 by using pipes, hence when the first outlet valve 23 is turned on, the mixed cold and hot water from the mixing valve 22 flows out of the showerhead 211, and when the first outlet valve 23 is turned off, the mixed cold and hot water from the mixing valve 22 stops flowing out of the showerhead 211.

The second outlet valve 24 is electrically connected with the second outlet switch 17 to be turned on/off and connected with the head shower 212 of the first watering device 210 by using the pipes, hence when the second outlet valve 24 is turned on, the mixed cold and hot water from the mixing valve 22 flows out of the head shower 212, and when the second outlet valve 24 is turned off, the mixed cold and hot water from the mixing valve 22 stops flowing out of the head shower 212.

The third and the fourth outlet valves 25, 26 are electrically connected with the first outlet switch 16 individually to be turned on/off and connected with the first and the second body sprays 221, 222 of the second watering device 220 by ways of the pipes individually, therefore when the third and the fourth outlet valves 25, 26 are turned on, the mixed cold and hot water from the mixing valve 22 flows out of the first and the second body sprays 221, 222, and when the third and the fourth outlet valves 25, 26 are turned off, the mixed cold and hot water from the mixing valve 22 stops flowing out of the first and the second body sprays 221, 222.

The central process unit 30 executes micro-machine control calculation based on an instruction from the input interface 10 to control the valve unit 20, and further includes a setting module 31, a time module 32, a memory module 33, a calculator module 34, and a water monitor module 35.

The setting module 31 is used to provide the following functions:
 1. setting water cost;
 2. setting flow rate;
 3. setting quantities of the showerhead 211 and the head shower 212;
 4. resetting a water meter;
 5. setting the personalized water demand.

The data set by the above-mentioned function is stored in the memory module 33.

The time module 32 is started to count a time of water use. In other words, when a user presses the first outlet switch 16 of the input interface 10, the first and the second body sprays 221, 222 are started to flow water, and the time module 32 is started as well to count a watering time of the first and the second body sprays 221, 222 simultaneously. Also, when the user presses the first and the second outlet switches 16, 17 of the input interface 10, the time module 32 is started to count a watering time of the showerhead 211 and the head shower 212, and when the first, the second, and the third outlet switches 16, 17, 18 are pressed again, the showerhead 211 and the head shower 212 are closed to stop spraying water, and the time module 32 is stopped counting the watering time of the showerhead 211 and the head shower 212.

The memory module 33 is applied to receive and record a variety of data and transmit the data toward a suitable module. In other words, the memory module 33 receives and records various data set by the setting module 31, such as the flow rate, the water cost, the personalized water demand, the quantities of the showerhead 211 and the head shower 212, and then the memory module 33 transmits the data toward the time module 32 to be counted and receives the data calculated by the calculator module 34, such as the quantities of the water use, the last water use, and the total water use and total water cost, wherein the quantities of the last water use and the total water use and the total water cost are transmitted back to the calculator module 34 to be calculated with the quantity of the water use and the water cost, and then calculated data is simultaneously transmitted toward the water monitor module 35 to be acquired.

Figure 9:
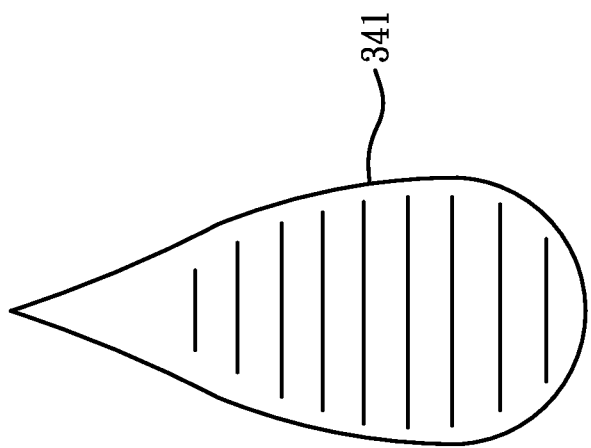
FIG. 9 is a side plan showing a water drop pattern displayed in the indicator according to the preferred embodiment of the present invention.

The calculator module 34 calculates the water cost on the basis of the quantities of the water use and the total water use and the total water cost. In other words, the calculator module 34 receives the calculated data from the time module 32 and calculates the quantities of the water use, the last water use, and the total water use and the total water cost, wherein calculated water use data, e.g., the quantity of the water use is transmitted toward the water monitor module 35 to be transmitted toward the indicator 40 so as to be further displayed as a water drop pattern 341 as shown in FIG. 9, hence the user controls the information of water use, and the quantities of the water use, the last water use, and the total water use and the total water cost are transmitted toward the memory module 33 to be stored.

The water monitor module 35 is used for receiving the data of the quantities of the last water and the total water use and total water cost from the calculator module 34, and when the user operates the water monitor module 35 via the input interface 10, the indicator 40 displays the information of the water use to be known by the user.

The digital shower system is operated based on steps of: setting water rate, checking the water monitor, setting an operating process of the first and the second body spray, setting an operating process of the personalized water demand, executing an operating process set by the user and an operating process of resetting the water meter, wherein an operating process of setting the water cost is transmitted into the setting module 31 of the central process unit 30 by using the input interface 10 and the indicator 40, and the water cost, the flow rate, and the quantity of the first and the second body spray are set and stored in the memory module 33.

Figure 3:
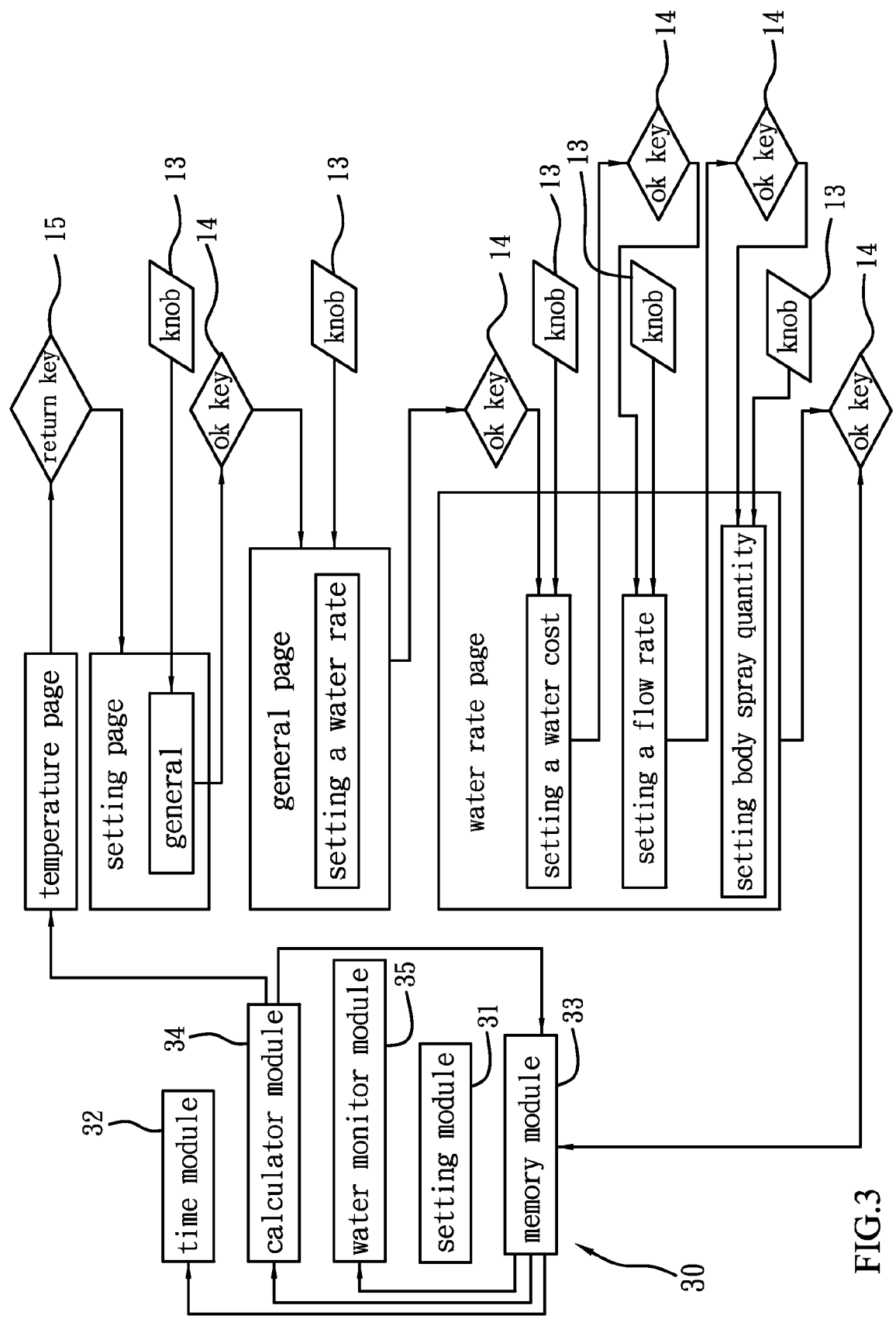
FIG. 3 is a block diagram showing steps of setting water cost according to the preferred embodiment of the present invention.

As shown in FIG. 3, steps of setting the water rate include:
starting the power key 11, wherein a screen of the indicator 40 enters into a temperature page to press the return key 15 of the input interface 10 so that a setting page is shown; selecting a general set by using the knob 13 and pressing the ok key 14 to enter a general page; setting the water rate by using the knob 13 and pressing the ok key 14, setting the water cost, the flow rate, and the quantities of the first and the second body spray and pressing the ok key 14 to record above-mentioned set values in the memory module 33, thus setting the water rate.

It is to be noted that the water cost, such as water cost/per unit of water rate, is set on the basis of the water cost in different areas or countries. The flow rate is set according to the watering devices of the showering equipment 200, such as specific values of watering rates of the first and the second watering devices 210, 220.

Figure 4:
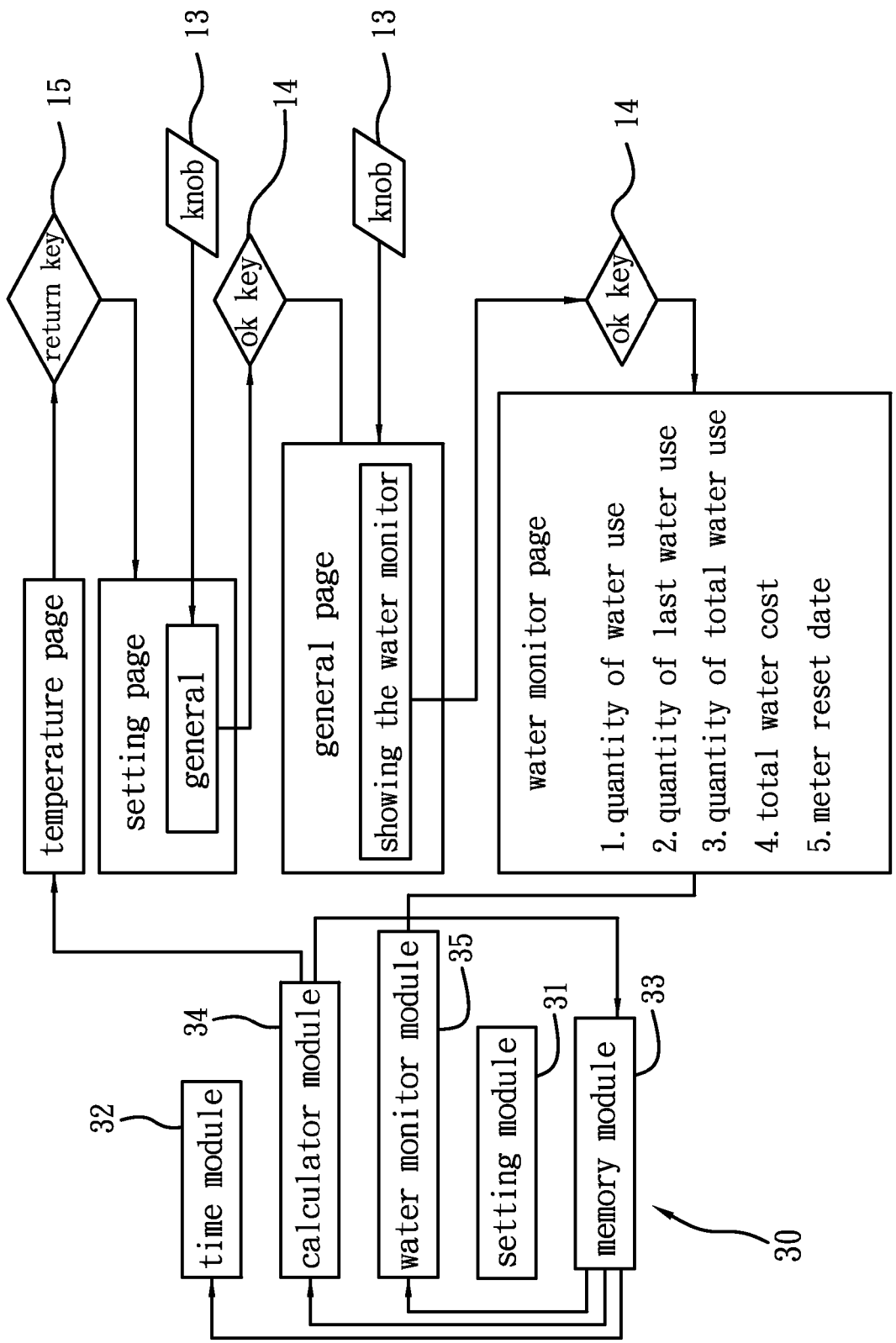
FIG. 4 is a block diagram showing steps of checking the water monitor according to the preferred embodiment of the present invention.

As illustrated in FIG. 4, steps of checking the water monitor include:

starting the power key 11 so that the screen of the indicator 40 enters into the temperature page to press the return key 15 of the input interface 10, such that the setting page is shown; selecting the general set by using the knob 13 and pressing the ok key 14 to enter the general page; selecting the water monitor by using the knob 13 and pressing the ok key 14 to enter a water monitor page, such that a water monitoring information from the water monitor module 35 is shown, wherein the water monitoring information includes the quantities of the water use, the last water use, and the total water use, the total water cost, and a water meter reset date, etc.

Figure 5:
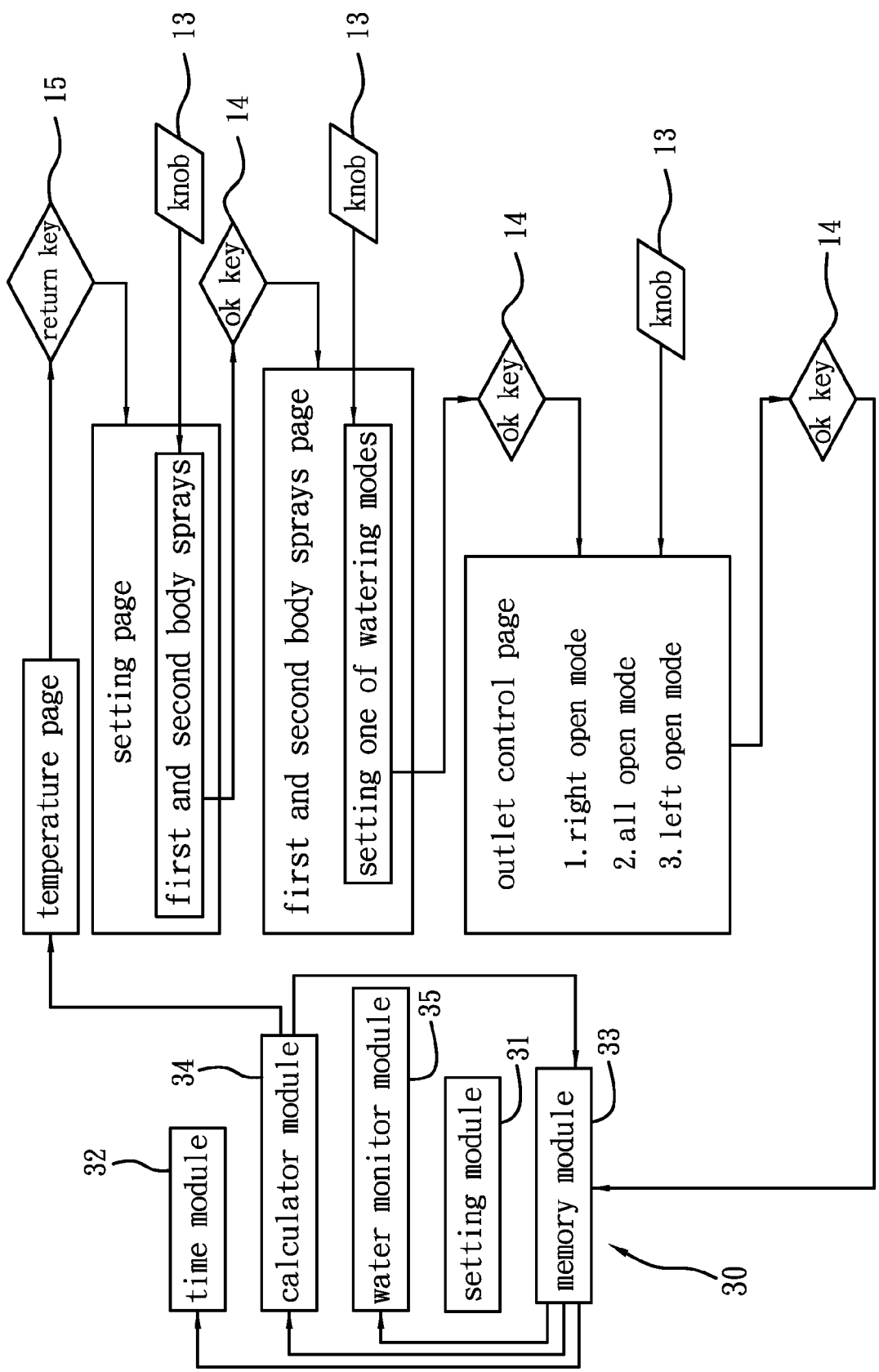
FIG. 5 is a flow chart showing steps of setting the first and the second body sprays according to the preferred embodiment of the present invention.

Referring to FIG. 5, steps of setting the first and the second body sprays include:

starting the power key 11 so that the screen of the indicator 40 enters into the temperature page to press the return key 15 of the input interface 10 so as to further enter the setting page; selecting the first and second body sprays by using the knob 13 and pressing the ok key 14 to enter a body spray page and to enter an outlet control page by using the knob 13; setting one of watering modes by ways of the knob 13 and pressing the ok key 14 to store desired set values in the memory module 33, wherein the watering modes including a right open mode, an all open mode, and a left open mode, thereby setting the first and the second body spray.

It is to be noted that the right open mode is to start spraying water from the two second body sprays 222, the left open mode is to start spraying water from the two first body sprays 221, and the all open mode is to start spray water from the first and the second body sprays 221, 222.

Figure 6:
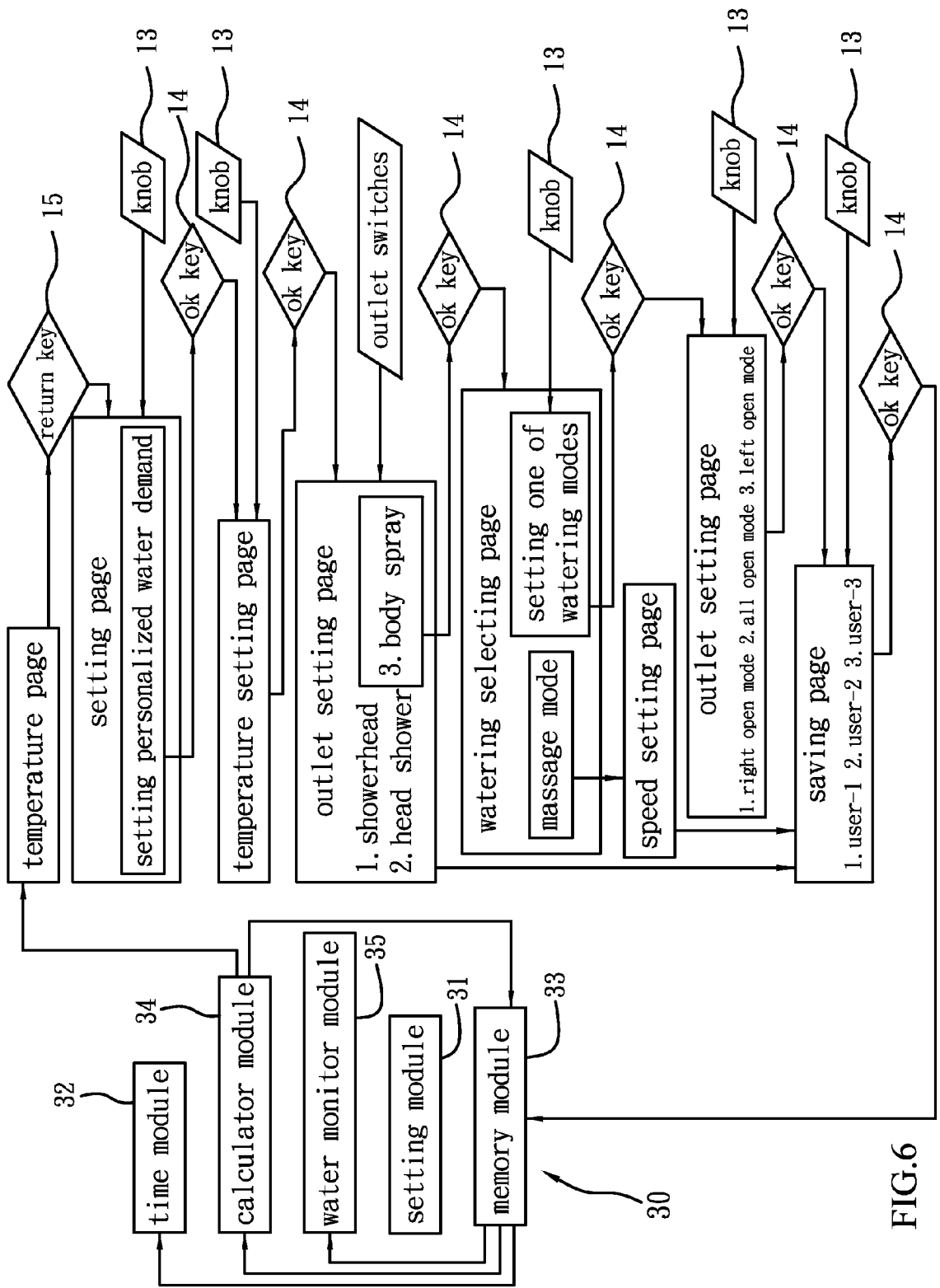
FIG. 6 is a flow chart showing steps of setting the personalized water demand according to the preferred embodiment of the present invention.

With reference to FIG. 6, steps of setting the personalized water demand include:

starting the power key 11 so that the screen of the indicator 40 enters the temperature page to press the return key 15 of the input interface 10 such that the setting page is shown; selecting the personalized water demand by means of the knob 13 and pressing the ok key 14 to enter a temperature setting page so that an outlet temperature is set by using the knob 13 and confirmed by pressing the ok key 14 to enter an outlet setting page, wherein there are three watering modes to be selectively set in the outlet setting page, and the three watering modes include a showerhead mode, a head shower mode, and a body spray mode; selecting one of the three watering modes in a watering selecting page by pressing the first, the second, and the third outlet switches 16, 17, 18, for example, when the first outlet switch 16 is selected, the first and the second body spray are turned on or off, and when the second and the third outlet switches 17, 18 are selected, the head shower and the showerhead are turned on or off individually, wherein when the head shower and/or the showerhead are selected and the ok key 14 is pressed, a saving page is shown so that one of codes including user-1, user-2, and user-3 is set by using the knob 13 and confirmed by pressing the ok key to enter the memory module 33, thereby the personalized water demand is obtained based on the set data.

It is to be noted that when the first and the second body spray are set and confirmed by pressing the ok key 14, a body spray setting page is shown so that a massage mode and an outlet control mode is selected by the user by using the knob 13, wherein as the massage mode is selected and confirmed by pressing the ok key 14, a speed setting page is shown so that an intermit spraying speed or frequency of the first and the second body sprays 221, 222 is adjusted by means of the knob 13 and confirmed by pressing the ok key 14 to enter the saving page, thereafter one of the codes is set by using the knob 13. Furthermore, after the user selects the outlet control mode and presses the ok key 14, the outlet setting page is shown so that one of the watering modes (the right open mode, the all open mode, and the left open mode) is selected by using the knob 13 and confirmed by pressing the ok key 14 to enter the saving page so as to set the code, thereby setting the personalized water demand.

Figure 7:
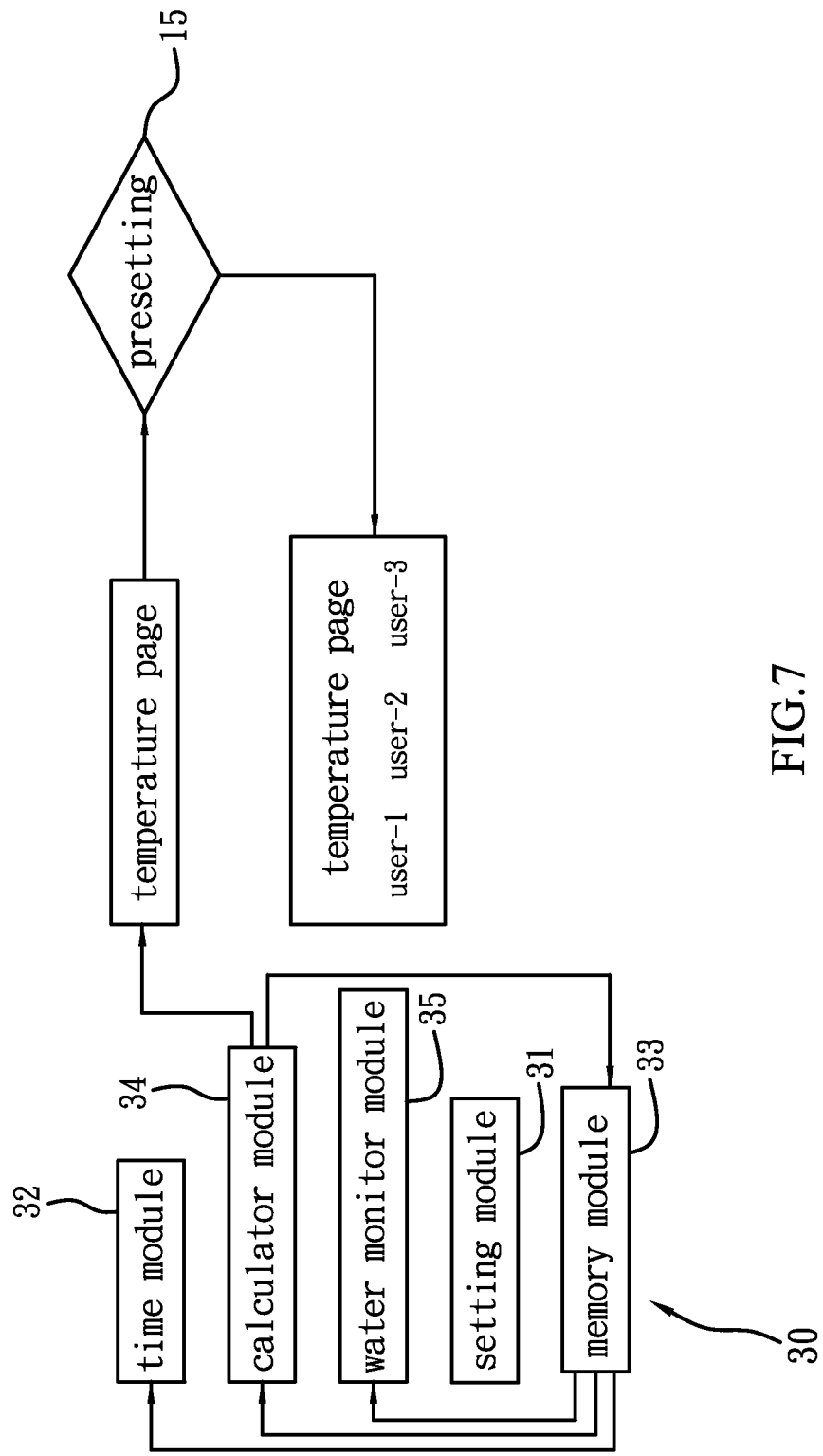
FIG. 7 is a flow chart showing steps of presetting the user according to the preferred embodiment of the present invention.

Referring to FIG. 7, steps of presetting the user include:

starting the power key 11 so that the screen of the indicator 40 enters the temperature page, such that the preset key of the interface 10 is pressed to select a set code during setting the personalized water demand, for example, when the user-1 is selected, the showering equipment executes a desired watering mode according to a selected code, e.g., user-1, to make the user have a shower in a selected watering mode.

Figure 8:
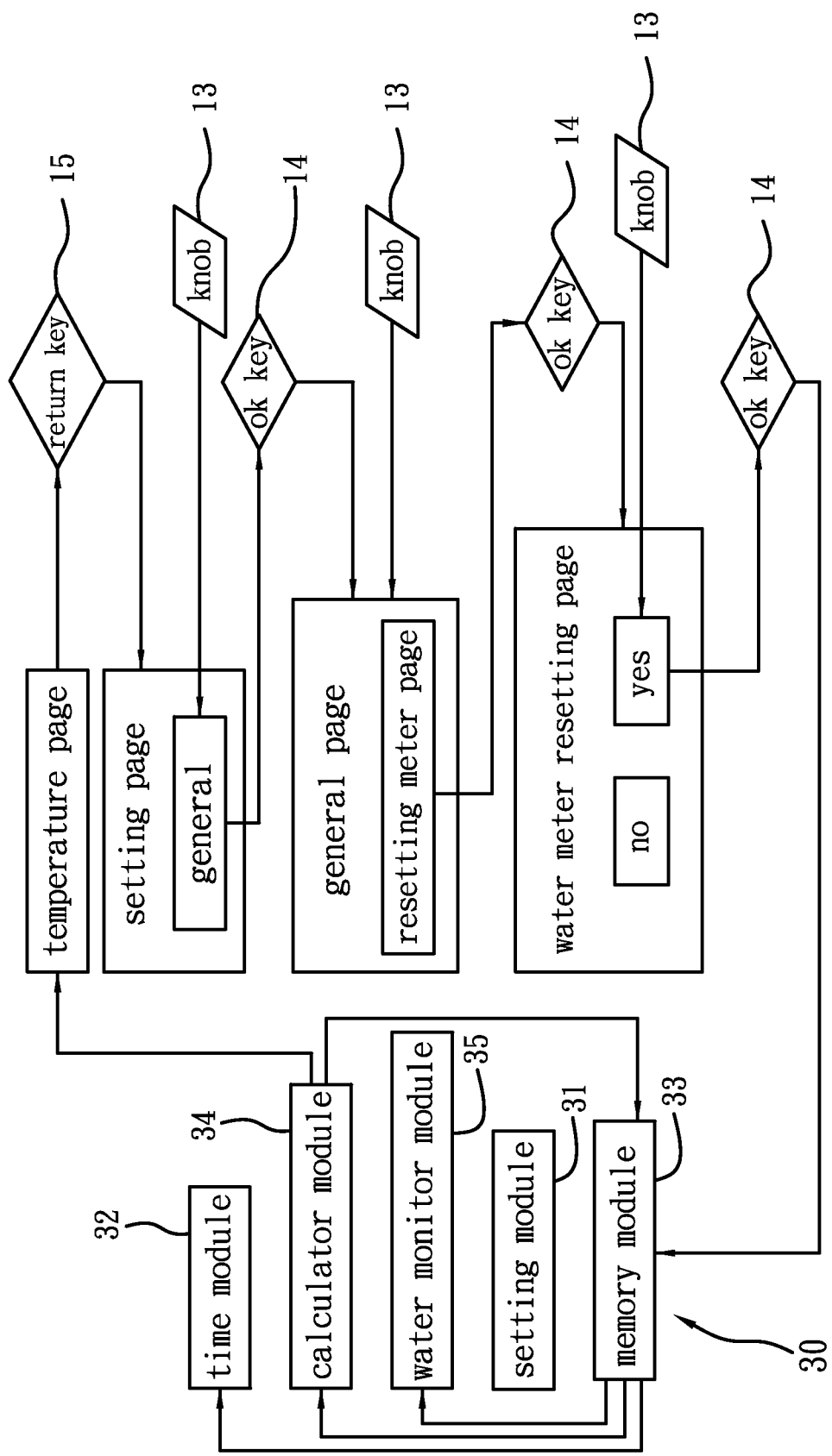
FIG. 8 is a flow chart showing steps of resetting the water meter according to the preferred embodiment of the present invention.

As shown in FIG. 8, steps of resetting the water meter include:

starting the power key 11 so that the screen of the indicator 40 enters the temperature page, such that the return key 15 of the interface 10 is pressed to enter the page setting page, and then the general mode is selected by using the knob 13 and confirmed by pressing the ok key 14 to enter the general page, and a water meter resetting mode is selected by using the knob 13 and confirmed by pressing the ok key 14 to enter a water meter resetting page so that the knob 13 is used to select a yes or no instruction, wherein if the yes instruction is selected and confirmed by pressing the ok key 14, the data of the quantities of the water use, the last water use, and the total water use and total water cost stored in the memory module 33 is deleted completely to restart calculating and storing water demand data; and if the no instruction is selected and confirmed by pressing the ok key 14, the data of the quantities of the water use, the last water use, and the total water use and total water cost is stored in the memory module 33 without being deleted, thus resetting the water meter.

While we have shown and described various embodiments in accordance with the present invention, it is clear to those skilled in the art that further embodiments may be made without departing from the scope of the present invention.

What is claimed is:

1. A digital shower system comprising:
a showering equipment including at least one first watering device and at least one second watering device;
an input interface including a power key, a knob, an ok key, a return key, and a first, a second, and a third outlet switches;
a valve unit including a motor, a mixing valve, and a number of outlet valves; wherein the motor is controlled by the knob to adjust temperature; the mixing valve is used to receive cold and hot waters and driven by the motor to adjust a mixing rate of the cold and the hot waters; the outlet valves are connected with the mixing valve so as to receive mixed cold and hot water from the mixing valve respectively and are turned on/off, when the outlet valves are turned on, the mixed cold and hot water are flowed toward the first or the second watering device of the showering equipment;
a central process unit used to execute micro-machine control calculation based on an instruction from the input interface to control the valve unit, and including a setting module, a time module, a memory module, a calculator module, and a water monitor module; wherein
the setting module is used to execute general sets having setting a water cost, setting a flow rate, setting quantities of a showerhead and a head shower, and above set data is stored in the memory module;
the time module is started to count a time of water use when one of the first, the second, and the third outlet switches is turned on to spray water, and data of the water use is transmitted toward the calculator module to be calculated;

the memory module is applied to receive and record a variety of data and transmit the data toward a suitable module, the memory module receives and records data set by the setting module and transmits the data from the calculator module;

the calculator module calculates the water cost on the basis of the quantities of the water use and the total water use and the total water cost, and calculated water use data is transmitted toward the memory module to be stored, and the quantity of the water use is transmitted toward an indicator to be displayed in a predetermined pattern, wherein the pattern is changed with increasing the quantity of the water use;

the water monitor module is used for receiving the data of the quantities of the water use, the last water and the total water use and total water cost from the memory module and the calculator module;

the indicator is used to provide a screen to display the quantity of the water use transmitted from the calculator module so that a user knows information of the water use in the indicator by operating the input interface.

2. The digital shower system as claimed in claim 1, wherein the showering equipment includes two first watering devices, and the two first watering devices include a showerhead and a head shower; the second watering device includes two first body sprays and two second body sprays; the outlet valves of the valve unit includes a first outlet valve, a second outlet valve, a third outlet valve, a fourth outlet valve; the first and the second outlet valves are coupled with the showerhead and the head shower respectively; the third outlet valve is connected with the first body sprays; the fourth outlet valve is connected with the second body sprays.

3. The digital shower system as claimed in claim 1, wherein the power key of the input interface has power on/off and pause functions.

4. The digital shower system as claimed in claim 1, wherein the mixing valve is coupled with a cold-water inlet tube and a hot-water inlet tube, when the knob is rotated, the mixing rate of the cold and the hot waters from the cold-water inlet tube and the hot-water inlet tube is changed to adjust a mixed temperature of the cold and the hot waters.

5. The digital shower system as claimed in claim 1, wherein the setting module has a function to set a personalized water demand so that the user sets a desired watering mode, and after the desired watering mode is set, it is stored in the memory mode.

6. The digital shower system as claimed in claim 5, wherein setting personalized water demand includes setting an outlet and a watering mode; setting the outlet is used to select watering from the outlet of the first or the second watering device; setting the watering mode includes include setting a massage mode and an outlet control mode, the massage mode is applied to adjust an intermit spraying speed or frequency of the first and the second body sprays, the outlet control mode is used to select one of the watering modes, and the watering modes includes a right open mode, an all open mode, and a left open mode.

7. The digital shower system as claimed in claim 5, wherein the input interface further includes a preset key connected with the memory module to acquire a record for the personalized water demand stored in the memory mode so that the user has a shower based on the desired watering mode.

8. The digital shower system as claimed in claim 1, wherein the setting mode includes resetting a water meter to delete the data of the quantities of the water use, the last water use, and the total water use and total water cost stored to restart calculating and storing water demand data.

* * * * *